United States Patent [19]

Oda et al.

[11] Patent Number: 5,303,657
[45] Date of Patent: Apr. 19, 1994

[54] BOGIE FRAME OF ROLLING STOCK HAVING COMPOSITE HOLLOW BEAM CONSTRUCTION

[75] Inventors: Kazuhiro Oda, Musashi-Murayama; Tetsujiro Fukui; Yukio Minowa, both of Utsunomiya, all of Japan

[73] Assignees: Fuji Jukogyo Kabushiki Kaisha; Railway Technical Research Institute, both of Tokyo, Japan

[21] Appl. No.: 921,642

[22] Filed: Jul. 30, 1992

[30] Foreign Application Priority Data

Aug. 5, 1991 [JP] Japan .................. 3-195518

[51] Int. Cl.⁵ .............................................. B61F 5/52
[52] U.S. Cl. .............................. 105/206.1; 105/182.1; 105/226; 52/731.2
[58] Field of Search ................. 105/157.1, 182.1, 202, 105/206.2, 226, 206.1G351 1; 52/730.4, 730.5, 731.2, 731.3, 731.4, 731.5, 731.6

[56] References Cited

U.S. PATENT DOCUMENTS

| 3,238,690 | 3/1966 | Wilkins ......................... 52/731.2 X |
| 3,995,080 | 11/1976 | Cogburn et al. ............... 52/731.6 X |
| 4,007,574 | 2/1977 | Riddell .......................... 52/731.2 X |
| 4,903,613 | 2/1990 | Lang et al. .................. 105/182.1 X |
| 5,085,151 | 2/1992 | Wako et al. ..................... 105/206.1 |

FOREIGN PATENT DOCUMENTS

| 53315 | 4/1977 | Japan ................. 105/206.2 |
| 244755 | 10/1987 | Japan . |
| 264935 | 11/1987 | Japan . |

OTHER PUBLICATIONS

"Aircraft Structures: Second Edition"; Peery et al.; McGraw-Hill Book Co.; 1982; pp. 92-93.
"Composite Materials for Aircraft Structures"; Hoskin et al.; AIAA Inc.; New York 1986; pp. 1-7, 73-91, 194, and 200-201.
"Sandwich Construction and Design"; Hackman, published in: "Analysis and Design of Flight Vehicle Structures"; Bruhn; Jacobs Publishing Inc; 1973; pp. C12.1-C12.9, C12.26-C12.28, PC12.51.

Primary Examiner—Robert J. Oberleitner
Assistant Examiner—S. Joseph Morano
Attorney, Agent, or Firm—Beveridge, DeGrandi, Weilacher & Young

[57] ABSTRACT

A rolling-stock bogie frame has a ladder-shaped frame structure comprising side beams and cross beams, each of which has a trough-shaped part with an open upper part and a reinforcing member secured to the trough-shaped part to cover and close the open upper part thereby to form a closed box beam with a utilizable hollow interior. Each of the trough-shaped part and reinforcing member comprises spaced apart inner and outer sheathings of fiber-reinforced plastic material and honey-comb members inserted between and bonded to the inner and outer sheathings. The bogie frame affords high strength with low weight. The hollow interior of the beam provides an equipment space for accommodating an air reservoir and piping for the pneumatic and hydraulic systems.

22 Claims, 5 Drawing Sheets

BOGIE FRAME OF ROLLING STOCK HAVING COMPOSITE HOLLOW BEAM CONSTRUCTION

BACKGROUND OF THE INVENTION

The present invention relates to a bogie frame for a magnetically levitated vehicle or a railway vehicle for traveling on rails. The term "bogie" is herein used to designate a wheeled carriage which is also called a "truck".

Rolling stock bogie frames known heretofore have been fabricated principally of steel materials. The weight of the bogie frame accounts for a large proportion of the total weight of the bogie. As an effort to minimize the weight, a number of measures for reducing the weight have been proposed. Among such proposals are those relating to the use of aluminum alloys and fiber-reinforced plastic (FRP) materials for the bogie frames.

More specifically, FRP material containing carbon fibers or glass fibers for reinforcement are used to fabricate long structural members, which are generally of tubular shape with rectangular cross section in the bogie construction of the type mentioned above. Hollows of the structural members are filled with foamed urethane. Thus core members are made. A plurality of the core members are assembled and wrapped with an FRP cover member to form main beams of the bogie frame. By this construction the bonding area between the core members and the covering FRP cover material is increased. As a result increased are tensile and shear strengths of the bogie frames. At the same time, the weight of the bogie frame is reduced. Such a construction is disclosed in Japanese Patent Appln. Laid-Open Publn. No. 62 264,935.

In another proposal for a rolling-stock bogie frame, FRP materials are used and a plurality of hollows are formed by means of spaced parallel webs fixed within each of elongated tubular members of rectangular cross section. Each hollow is filled with a filling material comprising fiber strands and foamed urethane. An object of the construction is reduction of the weight of the bogie frame. The above proposal is disclosed in Japanese Patent Appln. Laid-Open Publn. No. 62-244,755.

In a rolling-stock bogie frame of still another proposal, beam members are fabricated from elongated tubular members of rectangular cross section made of a carbon-fiber reinforced plastic material and filled with a filling material. By this construction, reduction in weight is sought. The construction is disclosed in Japanese Patent Appln. Laid-Open Publn. No. 61-143,257.

In each of the proposed bogie frames described above, each main beam member comprises an elongated tubular member of rectangular cross section made of an FRP material, and a filling material inserted into the tubular member. The construction of the known proposal aims at reduction in weight by using relatively thin outer sheathing in comparison with the case of bogie frames with hollows without the filling material. For this reason, the proportion of the filling material relative to the total weight becomes large. Moreover, the interiors of the bogie frame beams cannot be utilized for such purposes as accommodating an air tank or an air pipe for the pneumatic shock absorbing system.

SUMMARY OF THE INVENTION

Accordingly, in order to overcome the above described problems, it is an object of the present invention to provide a rolling-stock bogie frame in which the principal structural members are constructed to have hollows whereby equipment space for accommodating such items as an air tank or reservoir and piping is obtained, and at the same time the strength of the bogie frame is increased while its weight is reduced.

According to the present invention, there is provided a bogie frame of rolling stock, having a side beam and a cross beam integrally connected to the side beam to form a frame structure, a bearing box connected to the cross beam and an axle rotatably supporting a wheel via a connecting lever, each of said side beam and cross beam comprising a trough-shaped part forming opposite side walls and a bottom of the beam and having an open upper end, and a reinforcing member secured to the trough-shaped part to cover and close said open upper end, said each beam being a closed box beam with a hollow, each of the trough-shaped parts and the reinforcing members comprising an outer sheathing of a fiber-reinforced plastic material, an inner sheathing of a fiber-reinforced plastic material spaced apart from the outer sheathing and provided to form a space therebetween, and a honeycomb structure disposed in the space and bonded to the inner surfaces of the outer and inner sheathings.

As described above, the construction of the bogie frame according to the present invention provides a large installation space within the hollow beams for accommodating items of equipment such as an air reservoir or tank and piping. Moreover the construction provides high strength and light weight.

A preferred embodiment of the present invention will become understood from the following detailed description referring to the accompanying drawings.

DESCRIPTION OF THE PREFERRED EMBODIMENT

Figure 1:
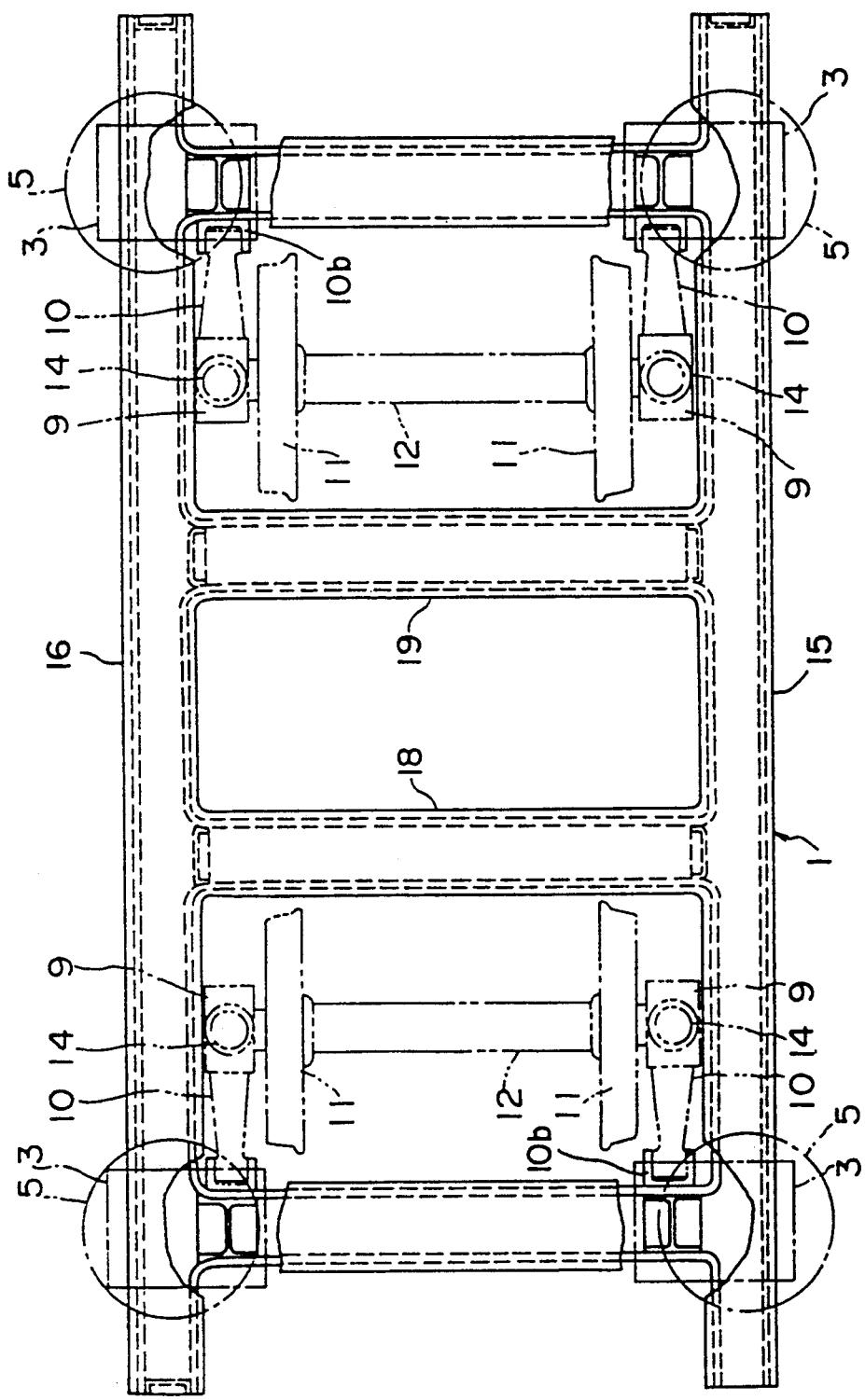
FIG. 1 is a plan view of an embodiment of a rolling-stock bogie frame according to the present invention.
Figure 2:
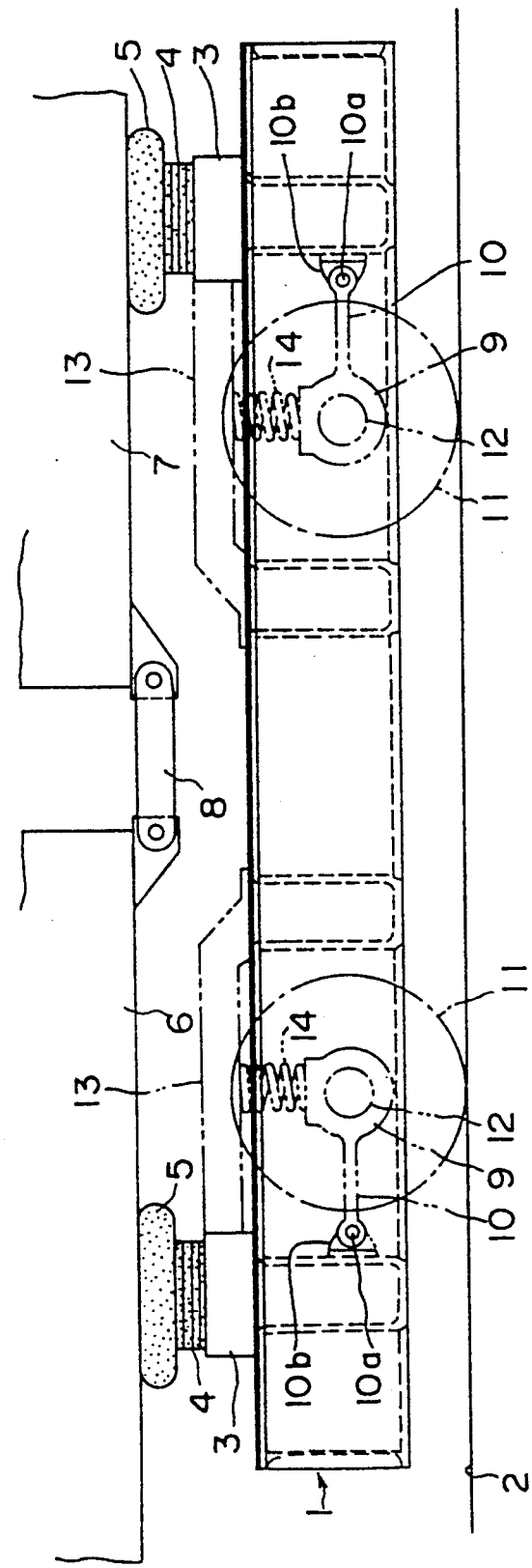
FIG. 2 is a side view of the bogie frame shown in FIG. 1.
Figure 3:
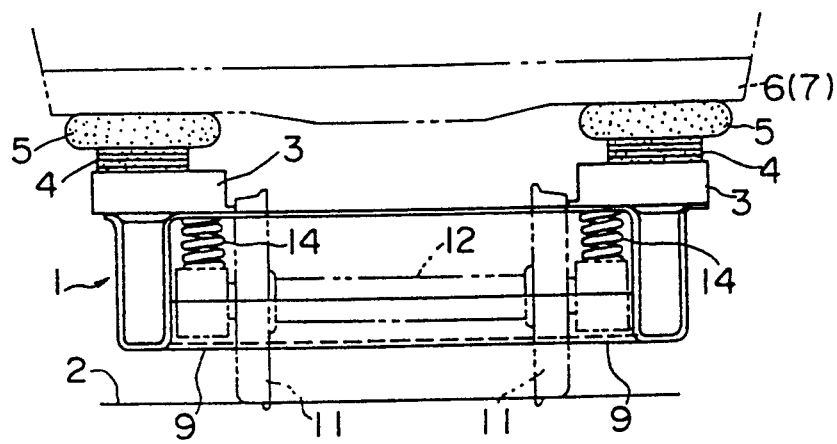
FIG. 3 is an end view of the bogie frame.

Referring to FIGS. 1 through 3, reference numeral 1 designates a bogie frame of a rolling stock vehicle for traveling on rails 2. Air spring holders 3 are respectively mounted on the upper part of the bogie frame 1 at front and rear end parts and at left and right sides thereof. The air spring holders 3 hold respective air springs 5 through laminated rubber assemblies 4 interposed therebetween. The air springs 5 support articulatedly coupled vehicle bodies 6 and 7 resting thereon. The vehicle bodies 6 and 7 are coupled by coupling bars 8.

The bogie frame 1 is supported on a plurality of wheels 11 (four wheels in the present embodiment). Two of the wheels 11 forming a pair are fixed to a common axle 12 near the ends thereof. The extreme ends of the axle 12 are rotatably supported in respective bearing boxes 9. Each bearing box 9 is coupled by a connecting lever 10 to the bogie frame 1 at a part thereof in the vicinity of a respective one of the air spring holders 3. Each connecting lever 10 at a root or inner end thereof is integrally fixed to a bearing box 9. The outer end of each connecting lever 10 is pivotally connected by a horizontal pin 10a to a bracket 10b fixed to the bogie frame 1 near the respective air spring holder 3. Thus the integral combination of each bearing box 9 and the connecting lever 10 constitutes a lever which is swingable in a vertical plane about the pin 10a. Furthermore, above each bearing box 9, an axle spring support beam 13 is fixed at one end to a respective one air spring holder 3. The support beam 13 extends horizontally in a longitudinal direction and is fixed at the other end to the bogie frame 1. An axle spring 14 is interposed between and fixed to each bearing box 9 and the support beam 13 thereabove.

Figure 6:
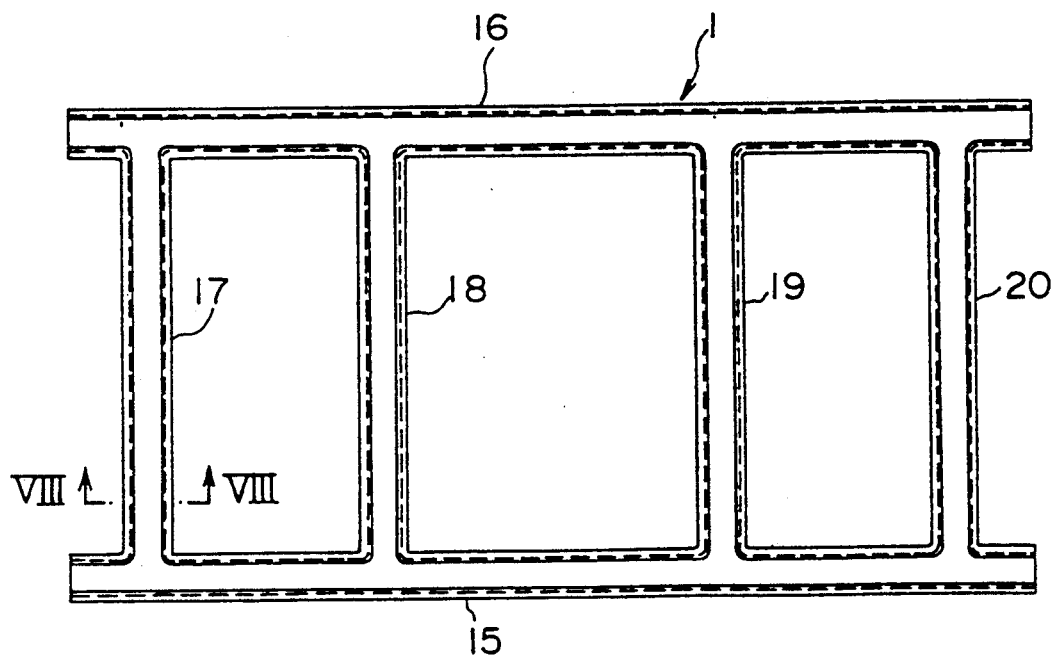
FIG. 6 is a plan view showing a ladder-form frame structure of the bogie frame.
Figure 7:
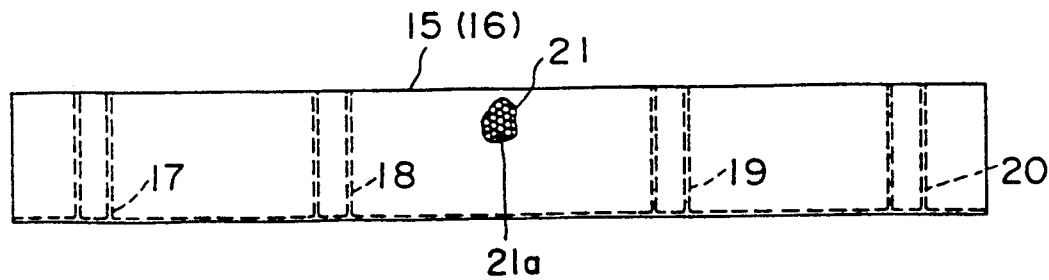
FIG. 7 is side view of the frame structure of FIG. 6.
Figure 8:
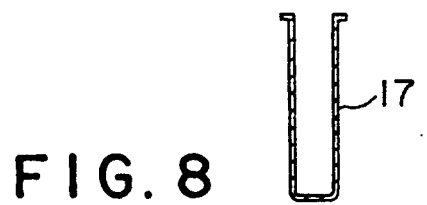
FIG. 8 is a cross section taken along the line VIII—VIII in FIG. 6.

As shown in FIGS. 6 and 7, the bogie frame 1 is of a rigid ladder construction. It comprises two side beams 15 and 16 on opposite lateral sides and four cross beams 17, 18, 19, and 20 joined at ends thereof to the side beams 15 and 16. The side beams and cross beams have a substantially rectangular cross section as shown in detail in FIG. 4. Each beam has a trough-shaped part 27 with an open upper part d and a reinforcing member 22 serving to cover and close the open upper part d. The trough-shaped part 27 of each beam has an outer sheathing 2 and an inner sheathing b comprising laminations of FRP prepreg fabric and formed as an integral structure. A honeycomb structure 21 is inserted in laminated state and bonded in the interior space c between the outer and inner sheathings a and b of each beam. The honeycomb structure 21 is made of heat and pressure resistant, light material, such as a heat resistant synthetic resin and/or an aluminum alloy. As shown in FIG. 7, the honeycomb hollow spaces 21a of the structure 21 extend in the thickness direction of each beam.

Figure 5:
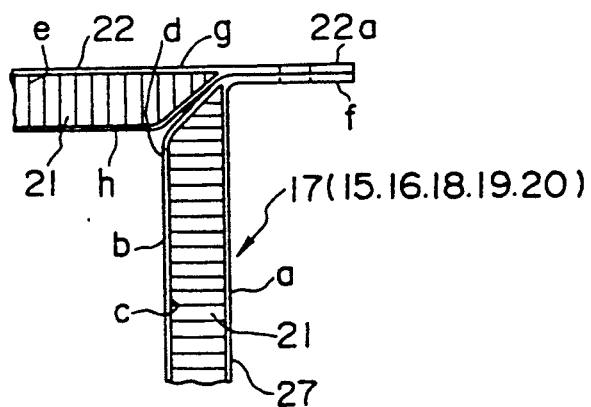
FIG. 5 is an enlarged sectional view of the part encircled by the chain line circle A in FIG. 4.

As indicated in FIG. 5, the reinforcing member 22 also has an outer sheathing g and an inner sheathing h made of a FRP material. In the space e between the outer and inner sheathing g and h, a honeycomb structure 21 is inserted in laminated state and is bonded. The honeycomb structure 21 is also made of a light material such as a heat and pressure resistant aluminum alloy. The upper edges of the trough-shaped parts 27 of each of the side and cross beams 15 through 20 have upper end flanges f extending horizontally outward. The above mentioned reinforcing members 22 are provided with outwardly extended lateral edges 22a on opposite sides thereof. When each reinforcing member 22 is placed in position on the corresponding trough-shaped part 27, the lateral edges 22a of the member 22 are superposed on their respective upper end flanges f of the trough-shaped part 27 and may be removably fixed thereto with suitable fasteners. By removing the reinforcing member 22 from the trough-shaped part 27, the interior of the part 27 can be checked.

Each of the upper end flanges f is formed by overlapping and bonding together the upper parts of the outer and inner sheathings and b of the pertinent trough-shaped part 27. Similarly, each of the lateral edges 22a is formed by overlapping and bonding together the outer and inner sheathings g and h thereof. Thus, the honeycomb structure 21 is not present in the connecting part between each flange f and its lateral edge 22a.

Figure 9:
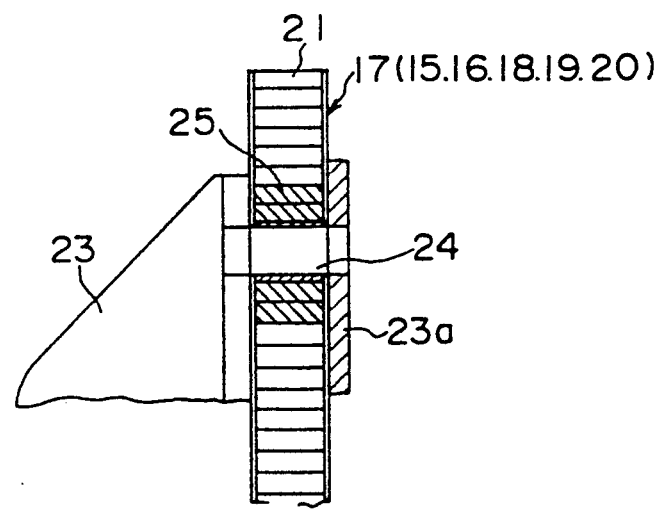
FIG. 9 is an enlarged sectional view showing the manner in which brackets are mounted on the bogie frame.
Figure 10:
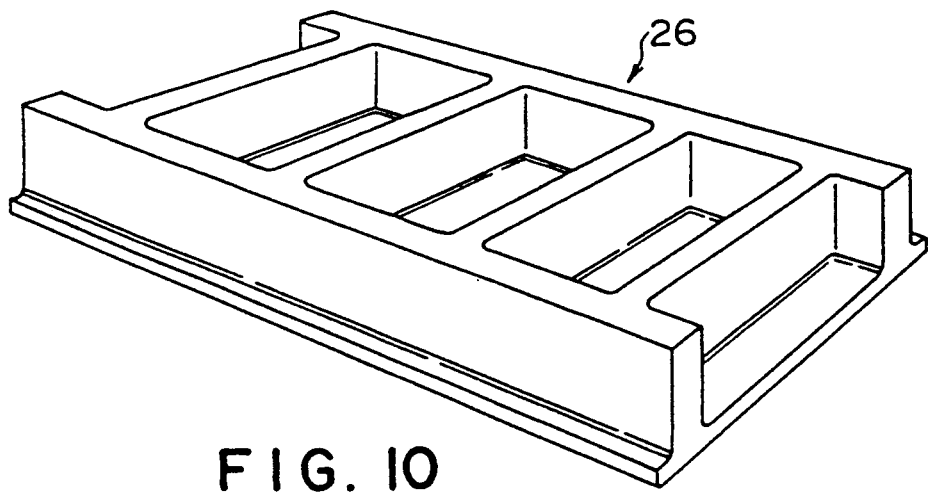
FIG. 10 is a perspective view of a mold used for forming the bogie frame.

Various items of equipment such as bearings, axle springs, and electric motors must be installed in the bogie frame 1. For mounting the items on the bogie frame 1, brackets 23 and the reinforcing plates 23a are used as shown in FIG. 9. The brackets 23 and reinforcing plates 23a are installed on the side beams and cross beams 15 through 20. For this purpose, mounting holes 24 are formed in the beams. First, the hollow spaces of the honeycomb structure 21 around each mounting hole 24 to be formed is filled by "resin potting" with a reinforcing material 25 such as a resin. Thereafter the mounting hole 24 is formed. The bogie frame 1 can be fabricated by forming the side beams and cross beams 15 through 20 as an integral structure of the reinforced plastic material of the laminated FRP prepreg fabric. This can be accomplished by means of a male mold 26 as shown in FIG. 10.

More specifically, the bogie frame 1 is fabricated by laying up the above mentioned inner sheathing b, the honeycomb structure 21, and the outer sheathing a in that order on the male mold 26. A vacuum bag is then placed thereon as a cover. The entire assembly thus formed is then placed in an autoclave and subjected to pressure and heat, thereby being cured and formed.

Figure 4:
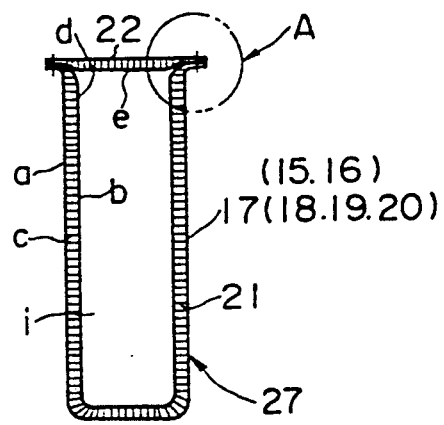
FIG. 4 is a cross sectional view showing a beam constituting an essential structural member of the bogie frame.

Thus, according to the present invention, a bogie frame 1 is formed as an integral structure without joints with a fiber-reinforced plastic material of laminated FRP prepreg fabric as shown in FIG. 6 by means of the male mold 26. As a result the weight of the bogie frame is reduced. At the same time, the honeycomb structure 21 is fitted, as it is laminated, into the spaces c and e. For this reason, the various members are reinforced. Furthermore, the hollow spaces i in the various beam members as shown in FIG. 4 can be effectively utilized for accommodating items of equipment such as an air tank.

Because of restrictions imposed by considerations of design, the height of the cross section of a beam of the bogie frame of the present invention may be limited. In such a case, in order to satisfy the strength requirement, the trough-shaped part of the beam is made to have an ample thickness. In this case, honeycomb structure for preventing buckling may become unnecessary. Furthermore, in order to reduce the weight of a beam while increasing the section modulus, an effective measure is to increase the thickness at the upper and lower parts of the beam.

As described above, the bogie frame according to the present invention comprises side beams and cross beams of rectangular cross sections which is formed as an integral structure of a fiber-reinforced plastic material. The outer part and inner part of each of the beams are formed by outer and inner sheathings. Between each outer sheathing and the corresponding inner sheathing, honeycomb structure is inserted and bonded. Each of the side and cross beams of the construction comprises a trough-shaped part with an open upper part and a reinforcement member covering the open upper part and secured to the upper part of the trough-shaped part. Thus, each beam has a hollow. The hollow can be advantageously utilized as an equipment installation space for accommodating equipment such as an air tank. At the same time, the integral monocoque construction of the bogie frame affords high strength with low weight.

While the presently preferred embodiment of the present invention has been shown and described, it is to be understood that the disclosure is for the purpose of illustration and that various changes and modifications may be made without departing from the scope of the invention as set forth in the appended claims.

What is claimed is:

1. A bogie frame apparatus, comprising:
   a frame structure having spaced side beams and a cross beam integrally connected with said side beams, said side beams and said cross beam each comprising:
      a trough-shaped part having opposite side walls and a bottom section which are arranged so as to provide an open upper end,
      a reinforcing member secured to the trough-shaped part to cover and close said open upper end so as to form a closed box beam with a hollow,
      said trough-shaped part having flanges and said reinforcing member having lateral edges, said flanges and said lateral edges being superposed and adapted for securement,
      said trough-shaped part and said reinforcing member each including an outer sheathing of a fiber-reinforced plastic material, an inner sheathing formed of said fiber-reinforced plastic material and spaced from said outer sheathing so as to define a space therebetween, and a honeycomb structure disposed in said space and secured between said inner and outer sheathing, and
      said flanges being defined by overlapping and bonded end parts of the outer and inner sheathings of said trough-shaped part.

2. The bogie frame apparatus according to claim 1, wherein:
   said inner and outer sheathings are made from laminations of fiber-reinforced prepreg fabrics.

3. The bogie frame apparatus according to claim 1, wherein:
   said honeycomb structure is made of light metal.

4. The bogie frame apparatus according to claim 1, wherein:
   said honeycomb structure is made of an aluminum alloy.

5. The bogie frame apparatus according to claim 1, wherein:
   said honeycomb structure is made of synthetic resin.

6. The bogie frame apparatus according to claim 1, wherein:
   said honeycomb structure has hollow interior spaces extending in a direction transverse to said outer and inner sheathings.

7. The bogie frame apparatus according to claim 1 wherein said lateral edges are defined by overlapping and bonded end parts of the outer and inner sheathings of said reinforcing member.

8. The bogie frame apparatus according to claim 1 further comprising a bearing box and a connecting lever connected to said bearing box and to said cross beam, and said bogie frame apparatus further comprising a wheel axle supported by said bearing box.

9. A bogie frame apparatus, comprising:
   a frame structure having spaced side beams and a cross beam integrally connected with said side beams, said side beams and said cross beam each comprising;
      a trough-shaped part having opposite side walls and a bottom section which are arranged so as to provide an open upper end,
      a reinforcing member secured to the trough-shaped part and positioned so as to cover and close said open upper end so as to form a closed box beam with a hollow,
      said trough-shaped part having flanges and said reinforcing member having lateral edges, said flanges and said lateral edges being superposed and adapted for securement,
      said trough-shaped part and said reinforcing member each including an outer sheathing of a fiber-reinforced plastic material, an inner sheathing formed of said fiber-reinforced plastic material and spaced from said outer sheathing so as to define a space therebetween, and a honeycomb structure disposed in said space and secured between said inner and outer sheathing, and
      said lateral edges being defined by overlapping and bonded end parts of the outer and inner sheathings of said reinforcing member.

10. The bogie frame apparatus according to claim 9 wherein said flanges are defined by overlapping and bonded end parts of the outer and inner sheathings of said trough-shaped part.

11. The bogie frame apparatus according to claim 9 further comprising a bearing box and a connecting lever connected to said bearing box and to said cross beam, and said bogie frame apparatus further comprising a wheel axle supported by said bearing box.

12. The bogie frame apparatus according to claim 9 wherein said honeycomb structure has hollow interior spaces extending in a direction transverse to said outer and inner sheathings.

13. A bogie frame apparatus, comprising:
    a frame structure comprising spaced side beams and a cross beam integrally connected with said side beams,
    said side beams and cross beam including opposite side walls and a bottom section which are arranged so as to provide an open upper end, sad opposite side walls of said cross beam being integral with said opposite side walls of sad side beams so as to define an integral unit, and said opposite side walls and bottom section having an outer skin, a first honeycomb core contacting said outer skin and an inner skin spaced from said outer skin and in contact with said first honeycomb core, said inner skin defining an open storage space in said side beams and cross beam, and
    said side beams and cross beam further comprising a reinforcement member formed with an outer sheathing, an inner sheathing and a second honeycomb core positioned between said sheathings, and said reinforcement member being positioned over said open storage space so as to define an article containing location inside said frame structure and said reinforcement member being secured to said opposite side walls so as to define a high rigidity, light weight closed box beam arrangement, and wherein said opposite side walls includes flanges comprised of overlapping and joined end parts of said inner and outer skins, said reinforcing member includes lateral edges which extend outward of said second honeycomb core and are comprised of overlapping and joined end sections of said inner and outer sheathings, and said flanges and lateral edges being in a superposed and secured arrangement.

14. The bogie frame apparatus according to claim 13 further comprising a bearing box and a connecting lever connected to said bearing box and to said cross beam, and said bogie frame apparatus further comprising a wheel axle supported by said bearing box.

15. The bogie frame apparatus according to claim 13 wherein said first honeycomb core has hollow interior spaces extending in a direction transverse to said outer and inner skins.

16. The bogie frame apparatus according to claim 13 wherein said inner and outer skins include laminations of fiber reinforced prepreg fabrics.

17. The bogie frame apparatus according to claim 13 wherein said first and second honeycomb cores are formed of an aluminum alloy.

18. The bogie frame apparatus according to claim 13 wherein said first and second honeycomb cores are formed of a synthetic resin.

19. The bogie frame apparatus according to claim 13 wherein said frame structure includes a total of four cross beams extending laterally between said side beams which extend longitudinally, and each of said cross beams being longitudinally spaced and positioned between each free end of said side beams.

20. The bogie frame apparatus according to claim 13 further comprising a resin plug with resin of said resin plug extending within said first honeycomb core and between said side walls, said frame apparatus further comprising a mounting bracket fixed to one of said side walls and a reinforcement plate fixed to the other side wall, and said side walls, resin plug, bracket and reinforcement plate having a mounting hole formed therein.

21. A rolling stock bogie frame apparatus formed by a process comprising:
fabricating a frame structure by
(a) forming a laminate composition by laying up an outer skin, a honeycomb structure and an inner skin;
(b) placing said laminate composition on a male mold having a ladder-shaped configuration;
(c) covering said laminate composition and male mold with a vacuum bag;
(d) subjecting said laminate composition to pressure and heat so as to form said laminate composition to said male mold and to cure said laminate composition, said laminate composition being formed so as to have a bottom section and two side walls with each side wall having a free end;
(e) forming a reinforcing member having lateral edges;
(f) positioning said reinforcing member such that said lateral edges are superposed over the free ends of said side walls of said molded laminate structure and securing said free ends to said lateral edges so as to form a closed box frame structure with an installation space for accommodating items of equipment;
and wherein forming said frame structure further includes forming said free ends by bonding directly together said inner and outer skins, forming said reinforcing member by combining an inner sheathing, a honeycomb structure and outer sheathing, and forming said lateral edges by bonding directly together said inner and outer sheathings, and forming said frame structure further comprises securing said flanges and lateral edges together, and said inner and outer skins and said inner and outer sheathings are comprised of a plastic prepreg fabric.

22. A bogie frame apparatus, comprising:
a frame structure comprising spaced side beams and a cross beam integrally connected with said side beams,
said side beams and cross beam including opposite side walls and a bottom section which are arranged so as to provide an open upper end, said opposite side walls of said cross beam being integral with said opposite side walls of said side beams so as to define an integral unit, and said opposite side walls and bottom section having an outer skin, a first honeycomb core contacting said outer skin and an inner skin spaced from said outer skin and in contact with said first honeycomb core, said inner skin defining an open storage space in said side beams and cross beam, and
said side beams and cross beam further comprising a reinforcement member formed with an outer sheathing, an inner sheathing and a second honeycomb core positioned between said sheathings, and said reinforcement member being positioned over said open storage space so as to define an article containing location inside said frame structure and said reinforcement member being secured to said opposite side walls so as to define a high rigidity, light weight closed box beam arrangement, and wherein said bogie frame apparatus further comprises a resin plug with resin of said resin plug extending within said first honeycomb core and between said side walls, said frame apparatus further comprising a mounting bracket fixed to one of said side walls and a reinforcement plate fixed to the other side wall, and said side walls, resin plug, bracket and reinforcement plate having a mounting hole formed therein.

* * * * *